(12) United States Patent
Vigil et al.

(10) Patent No.: US 10,093,359 B2
(45) Date of Patent: Oct. 9, 2018

(54) VEHICLE FRONT FRAME ASSEMBLY, AND METHODS OF USE AND MANUFACTURE THEREOF

(71) Applicant: Honda Motor Co., Ltd., Tokyo (JP)

(72) Inventors: Fabian J. Vigil, Columbus, OH (US); Hirotomo Yamada, Dublin, OH (US); Hirokazu Matsuura, Dublin, OH (US); Brian E. Dressel, Worthington, OH (US); Jason T. Hardesty, Dublin, OH (US); Kurtis R. Horner, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 15/197,549

(22) Filed: Jun. 29, 2016

(65) Prior Publication Data
US 2018/0001934 A1    Jan. 4, 2018

(51) Int. Cl.
  *B62D 25/04* (2006.01)
  *B62D 25/08* (2006.01)
  *B62D 27/02* (2006.01)
  *B62D 21/15* (2006.01)

(52) U.S. Cl.
  CPC .......... *B62D 25/04* (2013.01); *B62D 21/152* (2013.01); *B62D 21/157* (2013.01); *B62D 25/08* (2013.01); *B62D 25/082* (2013.01); *B62D 25/088* (2013.01); *B62D 27/02* (2013.01)

(58) Field of Classification Search
  CPC .... B62D 25/04; B62D 21/157; B62D 21/152; B62D 25/08; B62D 25/082; B62D 25/088; B62D 27/02
  See application file for complete search history.

(56) References Cited

U.S. PATENT DOCUMENTS

| 4,355,844 | A | * | 10/1982 | Fantini Muzzarelli ..................... B62D 23/005 280/784 |
| 4,545,612 | A | * | 10/1985 | Harasaki ................ B62D 25/02 296/192 |
| 4,699,419 | A | * | 10/1987 | Kawase ................. B62D 25/04 296/192 |
| 4,883,309 | A | * | 11/1989 | Miyazaki ............. B62D 25/081 296/192 |

(Continued)

*Primary Examiner* — Paul N Dickson
*Assistant Examiner* — Timothy Wilhelm
(74) *Attorney, Agent, or Firm* — Kenealy Vaidya LLP (57) ABSTRACT

A frame assembly of a vehicle front portion includes a windshield lower beam. A damper mount is disposed on the front portion and deforms when subjected to an impact energy. An A-pillar includes upper and lower pillar portions, the upper pillar portion having a lower end disposed adjacent the windshield lower beam, and the lower pillar portion having an upper end disposed adjacent to the windshield lower beam. A joint includes first and second joint members, the first joint member connecting the windshield lower beam to the lower and upper pillar portions and being connected to the damper mount, the second joint member contained within the first joint member and connected to the windshield lower beam, and upper and lower pillar portions. The joint is configured to resist deformation due to the impact energy such that the damper mount deforms and dissipates the impact energy.

20 Claims, 5 Drawing Sheets

(56) References Cited

U.S. PATENT DOCUMENTS

| | | | | |
|---|---|---|---|---|
| 4,883,310 A * | 11/1989 | Miyazaki | B62D 25/06 | 29/469 |
| 5,052,742 A * | 10/1991 | Akoshima | B62D 25/081 | 296/192 |
| 5,269,585 A * | 12/1993 | Klages | B62D 29/008 | 296/201 |
| 5,316,367 A * | 5/1994 | Enning | B62D 29/008 | 296/187.09 |
| 5,332,277 A * | 7/1994 | Enning | B62D 25/081 | 296/192 |
| 5,343,666 A * | 9/1994 | Haddad | B62D 23/005 | 403/191 |
| 5,577,571 A * | 11/1996 | Rizzoli | B60G 3/20 | 180/291 |
| 5,586,799 A * | 12/1996 | Kanemitsu | B62D 25/081 | 296/187.01 |
| 6,086,100 A * | 7/2000 | Corporon | B62D 25/04 | 280/808 |
| 6,209,950 B1 * | 4/2001 | Hanyu | B62D 25/04 | 296/203.02 |
| 6,250,710 B1 * | 6/2001 | Matsuzaki | B62D 25/081 | 296/187.09 |
| 6,322,134 B1 * | 11/2001 | Yang | B62D 25/04 | 296/187.09 |
| 6,389,697 B1 * | 5/2002 | Benoit | B21D 26/14 | 219/617 |
| 6,447,052 B2 * | 9/2002 | Saeki | B62D 21/15 | 296/187.09 |
| 6,572,180 B2 * | 6/2003 | Kim | B62D 25/081 | 296/203.02 |
| 6,623,067 B2 * | 9/2003 | Gabbianelli | B62D 23/005 | 296/203.01 |
| 6,655,728 B2 * | 12/2003 | Sano | B62D 21/15 | 296/187.09 |
| 6,679,547 B2 * | 1/2004 | Ju-Sik | B62D 25/04 | 296/203.03 |
| 6,698,823 B2 * | 3/2004 | Kim | B62D 25/04 | 296/203.01 |
| 7,140,674 B2 * | 11/2006 | Miyoshi | B62D 25/04 | 296/193.05 |
| 7,651,158 B2 * | 1/2010 | Koizumi | B62D 25/08 | 296/146.15 |
| 7,703,805 B2 | 4/2010 | Sasaki et al. | | |
| 7,887,122 B2 * | 2/2011 | Baccouche | B62D 25/082 | 296/187.09 |
| 8,075,047 B2 * | 12/2011 | Yamada | B62D 25/04 | 296/193.09 |
| 8,123,285 B2 * | 2/2012 | Lee | B62D 25/163 | 296/187.02 |
| 8,444,211 B2 * | 5/2013 | Fujita | B62D 21/152 | 296/187.05 |
| 8,651,563 B2 * | 2/2014 | Mildner | B62D 25/04 | 296/192 |
| 8,690,230 B2 * | 4/2014 | Suzaki | B62D 25/081 | 296/192 |
| 8,702,156 B1 * | 4/2014 | Chung | B62D 25/163 | 296/193.05 |
| 8,919,868 B2 * | 12/2014 | Nortmann | B62D 21/157 | 296/187.1 |
| 9,266,569 B1 * | 2/2016 | Tew | B62D 25/04 | |
| 9,371,093 B1 * | 6/2016 | Holmstrom | B62D 27/023 | |
| 9,540,047 B2 * | 1/2017 | Min | B62D 25/081 | |
| 9,840,284 B2 * | 12/2017 | Kang | B62D 25/081 | |
| 2014/0332305 A1 * | 11/2014 | Thomas | B60R 21/36 | 180/274 |
| 2015/0001889 A1 * | 1/2015 | Saje | B62D 25/04 | 296/201 |
| 2015/0166108 A1 * | 6/2015 | Persson | B62D 21/152 | 296/187.09 |
| 2015/0375800 A1 * | 12/2015 | Wagner | B62D 29/046 | 296/187.03 |

* cited by examiner

VEHICLE FRONT FRAME ASSEMBLY, AND METHODS OF USE AND MANUFACTURE THEREOF

BACKGROUND

The disclosed subject matter is directed to a vehicle front frame assembly, and methods of use and manufacture thereof. More particularly, the disclosed subject matter is directed to methods and apparatus for achieving enhanced crash performance from vehicle front crashes, and providing enhanced impact force dissipation.

A vehicle can include a frame assembly to provide structure and support for various components, such as for a suspension, and to define an interior, such as for a passenger compartment. These components can be displaced and deformed as a result of the vehicle collision with another object, potentially causing damage to the frame assembly or other components of the vehicle. Furthermore, vehicle occupants inside the passenger area may be injured based on the forces generated by the collision as well as from the resulting damage to the frame assembly.

SUMMARY

This potential damage and harm can be reduced or impeded based on a variety of factors, including providing configurations of the frame assembly having strategically reinforced and weakened components to facilitate where and how the frame assembly deforms. However, various vehicular design factors may make it challenging to re-configure the frame assembly to achieve these advantages. For example, frame integrity and layout considerations for vehicle frames and components may make it beneficial to provide a stiffer chassis to enhance ride quality and overall handling, as well as impact resistance. These rigid frames are less likely to deform as a result of a crash, and therefore dissipate impact energy from the crash by being displaced. As a result, displacing rigid frame elements can cause potential damage to other nearby components in the vehicle, as well as harm to nearby occupants should the occupants come into contact with a displaced frame element.

It may therefore be beneficial to provide a vehicle front frame assembly, and methods of use and manufacture thereof, that address at least one of the above and/or other challenges. In particular, it may be beneficial to enhance crash performance from vehicle front crashes while providing enhanced impact force dissipation, such as by configuring structures to dissipate impact energy away from significant or critical components and vehicle occupants. For example, portions of the frame assembly can be configured to absorb energy and deform in a predetermined manner to avoid being displaced into critical or significant components and occupants.

In some of these and/or other embodiments, the vehicle front frame assembly can be configured to include a relative weaker component, for example formed of aluminum sheet, connected to a reinforced component, for example formed of casting, to facilitate initial deformation of the weaker component in a crash. In some of these and/or other embodiments, the relatively weaker component of the frame assembly can be positioned between multiple strengthened components to absorb and dissipate impact energy, while maintaining structural integrity of the surrounding components. In some of these and/or other embodiments, the relatively weaker component can deform in a prescribed manner so as to maintain separation between the multiple strengthened components, as well as other rigid components of the vehicle and occupants located therein, to impede damage and harm.

Some of the embodiments are therefore directed to a frame assembly of a front body portion of a vehicle, the vehicle including a windshield connected to the front body portion, and at least one suspension component being connected to the front body. The frame assembly can include a windshield lower beam that extends along a lower edge of the windshield. A damper mount can be disposed on the front body portion at a location where the suspension component is connected to the front body portion, the damper mount being configured to deform when being subjected to an impact energy. An A-pillar can include an upper pillar portion and a lower pillar portion, the upper pillar portion having a lower end disposed adjacent the windshield lower beam, and the lower pillar portion having an upper end disposed adjacent to the windshield lower beam. A joint can include a first joint member and a second joint member, the first joint member connecting the windshield lower beam to each of the lower pillar portion and the upper pillar portion, the first joint member connected to the damper mount, the second joint member contained within the first joint member and connected to each of the windshield lower beam, upper pillar portion and lower pillar portion, and the joint being configured to resist deformation due to the impact energy such that the damper mount deforms and dissipates the impact energy transmitted to the joint and the A-pillar.

Some other embodiments are directed to a vehicle having a front body portion including a windshield. The vehicle can include a suspension component and a frame assembly configured to connect the suspension component to the front body portion of the vehicle. The frame assembly can include a windshield lower beam that extends along a lower edge of the windshield. A damper mount can be disposed on the front body portion at a location where the suspension component is connected to the front body portion, the damper mount being configured to deform when being subjected to an impact energy. An A-pillar can have an upper pillar portion and a lower pillar portion, the upper pillar portion having a lower end disposed adjacent the windshield lower beam, and the lower pillar portion having an upper end disposed adjacent to the windshield lower beam. A joint can include a first joint member and a second joint member, the first joint member connecting the windshield lower beam to each of the lower pillar portion and the upper pillar portion, the first joint member connected to the damper mount, the second joint member contained within the first joint member and connected to each of the windshield lower beam, upper pillar portion and lower pillar portion, and the joint being configured to resist deformation due to the impact energy such that the damper mount deforms and dissipates the impact energy transmitted to the joint and the A-pillar.

Still other embodiments are directed to a method of manufacturing a frame assembly of a front body portion of a vehicle, the vehicle including a windshield connected to the front body portion, and at least one suspension component being connected to the front body. The method can include: forming a windshield lower beam that extends along a lower edge of the windshield; disposing a damper mount on the front body portion at a location where the suspension component is connected to the front body portion, the damper mount being configured to deform when being subjected to an impact energy; defining an A-pillar including an upper pillar portion and a lower pillar portion, the upper pillar portion having a lower end disposed adjacent the windshield lower beam, and the lower pillar portion having an upper end disposed adjacent to the windshield lower beam; and connecting a joint including a first joint member and a second joint member, the first joint member connecting the windshield lower beam to each of the lower pillar portion and the upper pillar portion, the first joint member connected to the damper mount, the second joint member contained within the first joint member and connected to each of the windshield lower beam, upper pillar portion and lower pillar portion, and the joint being configured to resist deformation due to the impact energy such that the damper mount deforms and dissipates the impact energy transmitted to the joint and the A-pillar.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various headings are provided below for convenience and clarity. However, these headings are not intended to limit the scope or content of the disclosure, and/or the scope of protection afforded the various inventive concepts disclosed herein.

I. Overall Vehicle

Figure 1:
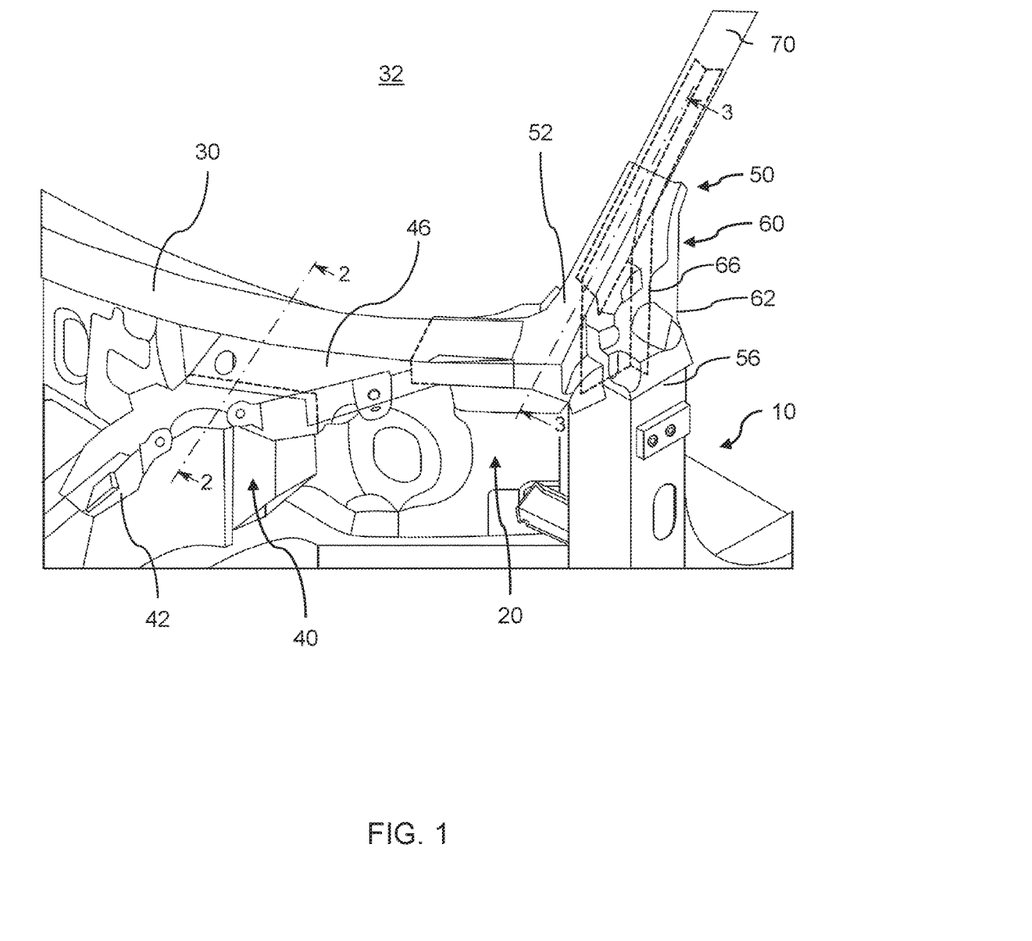
FIG. 1 is a partial perspective view of an exemplary front body portion of a vehicle including a front frame assembly in accordance with principles of the disclosed subject matter.

FIG. 1 is a partial perspective view of an exemplary front body portion 10 of a vehicle including a front frame assembly 20 in accordance with principles of the disclosed subject matter. The vehicle shown in FIG. 1 is primarily for use on paved roadways, and can be referred to as a passenger vehicle. The vehicle may also be for use on unpaved roadways consisting of gravel, dirt, sand, etc.

However, the front frame assembly 20 can be used with any vehicle that is configured for travel along any one or combination of improved, unimproved, and unmarked roadways and paths consisting of gravel, dirt, sand, etc. For example, embodiments are intended to include or otherwise cover any type of automobile, including passenger car, minivan, truck, etc. In fact, embodiments are intended to include or otherwise cover configurations of the front frame assembly 20 for use in any other type of vehicle, such as an aircraft, boat, ship, train, spacecraft, etc. Some other embodiments can be used in non-vehicular applications, such as for amusement park rides, or any other structure which may be involved in a crash or impact event.

The vehicle can include a body having both the front body portion 10 and a rear body portion, the front body portion 10 being disposed forward of the rear body portion along a longitudinal direction of the vehicle. The vehicle can further include a set of wheels, and the wheels can be connected to the body by a suspension. The suspension may include dampers serving as shock absorbers at each or some of the wheels, the dampers being mounted to the body. The vehicle can additionally define a passenger area within an interior of the vehicle, the front body portion 10 defining a front of the vehicle interior. The front body portion 10 can include a windshield 28 separating the vehicle interior from exterior surroundings of the vehicle. A powertrain may further be included in the vehicle. Elements of the vehicle, such as the rear body portion, wheels, suspension components, windshield 28, powertrain, etc. are omitted from FIG. 1 for simplicity and clarity of the drawings.

Descriptions of various components of the front frame assembly 20 below are descriptive of a left-side of the vehicle, however the following descriptions are also applicable to corresponding elements on the right-side of the vehicle that are not shown in the drawings.

II. Front Frame Assembly

The front frame assembly 20 shown in FIG. 1 can include a windshield lower beam 30 spanning a bottom of the windshield opening 32 (windshield 28 is not shown for clarity of the drawing) and defining a lower edge of a windshield opening 32. The windshield lower beam 30 of the present embodiment can be formed by extrusion; however other embodiments may form the windshield lower beam 30 through alternate processes. Sides of the windshield opening 32 are each defined by an A-Pillar 50 (right-side A-Pillar is not shown) extending from below the windshield lower beam 30 up towards a roof of the vehicle, as will be described below. The A-Pillar 50 extends past the windshield lower beam 30 towards the roof at an angle corresponding to that of the windshield 28. A dashboard panel 26 can also extend rearward from the windshield lower beam 30 in the longitudinal direction within the interior of the vehicle, as is shown in detail in FIG. 2 and described below.

The front frame assembly 20 can further include a damper mount 40 disposed on the front body portion 10 at a location where components of the suspension connect to the front body portion 10, so as to be forward of the windshield lower beam 30 in the longitudinal direction. For example, the damper mount 40 can be configured as a mounting support for a shock absorber (suspension components configured for connections to the damper mount 40 are omitted for clarity of the drawing).

The damper mount 40 can include a front damper base 42 which serves as mounting support for suspension components, and a rear damper base 46 adjacent a forward edge of the windshield lower beam 30 which connects the front damper base 42 thereto. Specifically, the rear damper base 46 can connect to a front of the windshield lower beam 30 between the A-pillar 50 and an intermediate portion of the windshield lower beam 30. The front damper base 42 can be formed by casting for structural rigidity, and the rear damper base 46 can be formed as an aluminum sheet so as to be readily deformable from transferred force of a crash or impact event, as will be described below. The front and rear damper bases 42,46 can be otherwise formed in alternate embodiments. The front and rear damper bases 42,46 can be connected to one another by facing and overlapping flanges extending from each.

As described above, the front frame assembly 20 can also include the A-pillars 50 (right-side A-Pillar is not shown) defining sides of the windshield opening 32 extending from below the windshield lower beam 30 up towards a roof of the vehicle. The A-pillars 50 also provide structure for side windows of the vehicle, and in conjunction with B-pillars, C-pillars, etc., support the roof the vehicle and frame respective windows. The A-pillar 50 can include an upper pillar portion 52 and a lower pillar portion 56. The upper and lower pillar portions 52, 56 can be formed as separate pieces integrally connected at facing ends. The upper pillar portion 52 can have a lower end 54 disposed adjacent the windshield lower beam 30, and the lower pillar portion 56 can have an upper end 58 disposed adjacent to the windshield lower beam 30. Thus, the upper pillar portion 52 extends from the windshield lower beam 30 upward towards the roof to define the left side of the windshield opening 32, and the lower pillar portion 56 extends from the windshield lower beam 30 downward towards a bottom of the vehicle. While the upper pillar portion 52 can partially define a side window opening, the lower pillar portion 56 can partially define a side door opening and may even serve as a mounting location for a door to be hingedly connected to the front body portion 10.

The windshield lower beam 30 can form a joint with the A-pillar 50 proximate the lower end 54 and the upper end 58 of the upper pillar portion 52 and the lower pillar portion 56, respectively. That joint can be reinforced by a joint structure 60 that will be described below.

The front frame assembly 20 of the present embodiment can be configured to include the joint structure 60 disposed between and configured to reinforce the joint between the windshield lower beam 30 and the A-pillar 50. The joint structure 60 can include a first joint member 62 and a second joint member 66. The first joint member 62 can connect the windshield lower beam 30 to each of the lower pillar portion 56 and the upper pillar portion 52. Particularly, the first joint member 62 can extend around the upper and lower pillar portions 52, 56 such that they are disposed within an interior of the first joint member 62. The first joint member 62 can also extend along the windshield lower beam 30 to be connected to the damper mount 40. The first joint member 62 in the present embodiment can be formed of casting for structural rigidity; however alternate embodiments can be otherwise formed.

Figure 2:
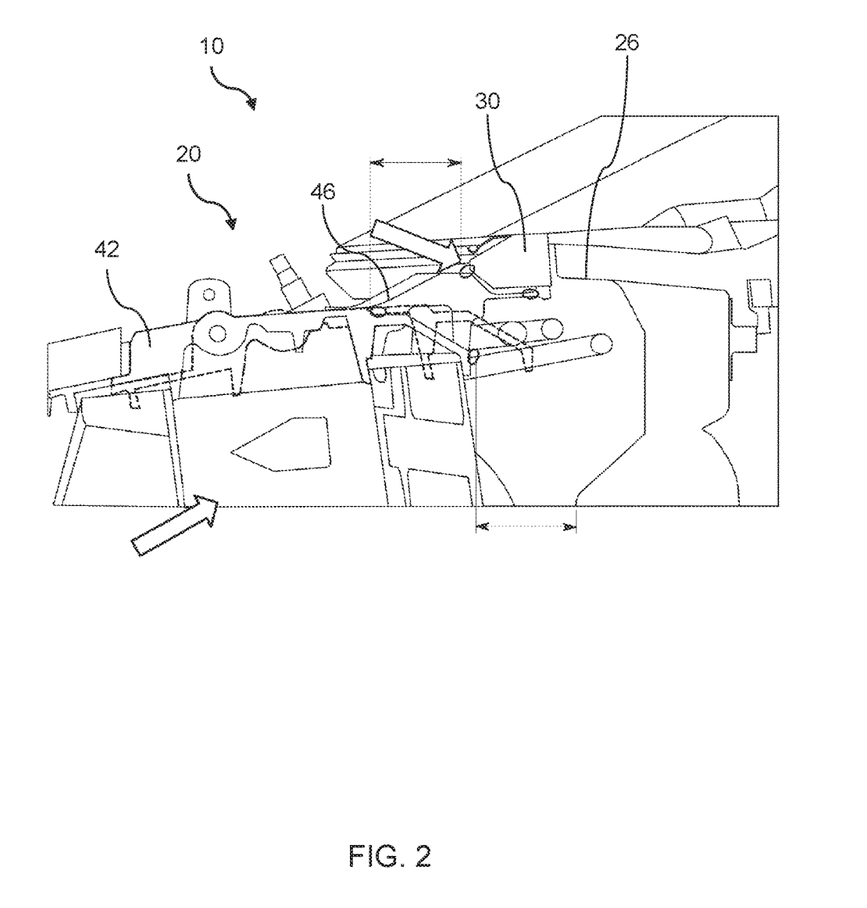
FIG. 2 is a cross-section view of a damper mount of the front frame assembly of FIG. 1.

The second joint member 66 can be configured as connected flanges and have an approximately L-shaped cross-section, as shown in more detail in FIG. 2, and also be contained within the interior of the first joint member 62. The second joint member 66 can further be connected to each of the windshield lower beam 30 and the upper and lower pillar portions 52,56 so as to serve as reinforcement of inside the joint while the first joint member 62 serves as reinforcement of outside the joint. The second joint member 66 can extend beyond a top of the first joint member 62 so as to reinforce the A-pillar 50 at a portion not connected to the first joint member 62. The second joint member 66 in the present embodiment can be formed of reinforced steel for structural rigidity, however alternate embodiments can be otherwise formed.

The joint structure 60 can be configured to resist deformation to the impact energy such that the damper mount 40 deforms and dissipates the impact energy transmitted to the joint structure 60 and the A-pillar 50 from a crash or impact event, as will be described below.

The front frame assembly 20 can additionally include an upper bracket 70 disposed along an exterior of an upper section of the A-pillar 50, the upper bracket 70 also being approximately L-shaped in cross-section. The upper bracket 70 can overlap the joint structure 60 such that a lower portion of the upper bracket 70 extends into the interior of the first joint member 62 and along an upper portion of the second joint member 66. The upper bracket 70 can be formed of a steel alloy in the present embodiment. The upper bracket 70 serves to further reinforce the A-pillar and the joint structure 60.

FIG. 2 is a cross-section view of the damper mount 40 of the front frame assembly 20 of FIG. 1. As shown in FIG. 2, the damper mount 40 can be configured to deform when being subjected to an impact energy such as in the instance of a crash.

The damper mount 40 is shown in FIG. 2 in normal and post-crash conditions (dashed lines). As a result of an impact event, an impact force F1 acts on suspension components such as a shock absorbed mounted to the front frame assembly 20 by the damper mount 40. The damper mount 40 is therefore subjected to the impact force F1 transferred by the connected suspension component. Due to relative structural rigidity of the front damper base 42, and relative structural weakness of the rear damper base 46, the front damper base 42 resists deformation and is displaced in a direction of the impact force F1. The rear damper base 46 in turn deforms from displacement of the connected front damper base 42. Specifically, the front damper base 42 can be displaced rearward in the longitudinal direction while the rear damper base 46 can be deformed rearward and downward. A deformation force F2 acts on portions of the rear damper base 46 connected to the front damper base 42 and the windshield lower beam 30. The rear damper base 46 is thereby caused to deform around the windshield lower beam 30 due to relative structural rigidity of the windshield lower beam 30.

Deformation of the damper mount 40 may dissipate energy generated from a vehicle crash, specifically a front crash involving the front body portion 10. By dissipating impact energy, the damper mount 40 can reduce transmission of such force to the windshield lower beam 30 and the A-pillar 50. As such, in the present embodiment the front damper base 42 and the rear damper base 46 are configured to be displaced and deform without intrusively contacting the windshield lower beam 30.

As shown in FIG. 2, the front damper base 42 and the rear damper base 46 of the damper mount 40 are each separated from the windshield lower beam 30 in both a normal condition prior to any crash or impact event, and a post-crash condition (shown in dashed lines). Furthermore, the front body portion 10 is configured such that the damper mount 40 remains spaced from the dashboard panel 26 of the vehicle in the post-crash condition after the damper mount 40 has been displaced and deformed. Distances of the above-described separation are shown with dimensional lines, and can be determined to fit various desired specifications of the damper mount 40 displacements and deformation as a result of a crash. Particularly, both vertical and horizontal distances remain between the damper mount 40 and other components of the front frame assembly 20 in the post-crash condition.

Thus, in the post-crash condition, the damper mount 40 deforms which dissipates or absorbs energy generated from the crash or impact event while remaining separated from the windshield lower beam 30. Therefore, even in its deformed, post-crash condition, the damper mount 40 does not intrusively contact the windshield lower beam 30. The above-described deformation thereby results in a reduction of input force communicated to both the windshield lower beam 30 and the A-pillar 50 from a crash.

Figure 3:
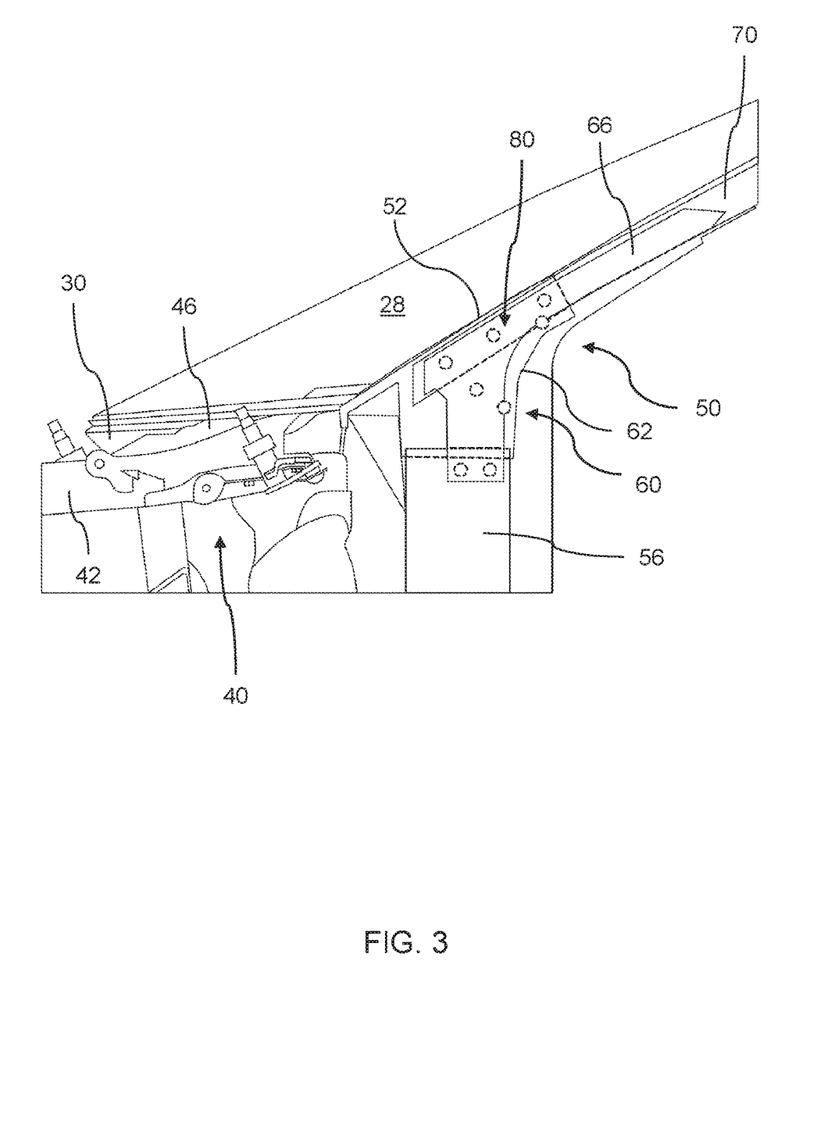
FIG. 3 is a cross-section view of a joint structure of the front frame assembly of FIG. 1.

FIG. 3 is a cross-section view of a joint structure 60 of the front frame assembly 20 of FIG. 1. As shown in FIG. 3, various components are configured to overlap and attach to each other to reinforce the joint between the windshield lower beam 30 and the A-pillar 50.

As described above, the first joint member 62 is configured to extend around the lower end 54 and the upper end 58 of the upper and lower pillar portions 52, 56, respectively, of the A-pillar 50. On the other hand, the second joint member 66 is configured to extend within the first joint member 62 to attach to and reinforce the upper and lower pillar portions 52,56 from the interior.

The first joint member 62 extends from the windshield lower beam 30 to the A-pillar 50, covering a lower portion of the A-pillar. The second joint member 66, being approximately L-shaped, can extend below and above the first joint member 62 along the A-pillar 50 so as to provide reinforcement further along the upper and lower pillar portions 52,56. The second joint member 66 is also attached to the upper bracket 70 extending along the A-pillar 50 for added reinforcement.

The above described components can be connected to each other and the front frame assembly 20 by a plurality of apertures and bolts inserted therethrough; however other fasteners may alternatively be used to connected components reinforcing the joint.

The joint structure 60 provided at the joint between the windshield lower beam 30 and the A-pillar serves to strengthen that portion of the vehicle frame. Strengthening that joint ensures that the joint does not constitute a relatively weak portion of the vehicle frame, and thus impedes the joint from being initially subject to significant deformation as a result of a crash. Conversely, the rear damper base 46 constitutes a structurally weaker element than the joint reinforced by the joint structure 60 such that the rear damper base 46 is initially subject to the above-described deformation. Therefore, because the joint is reinforced by the joint structure 60 and the damper mount 40 is relatively weaker, the damper mount 40 is more likely to deform to dissipate the energy generated by the crash.

III. Methods of Attaching the A-Pillar

Figure 4A:
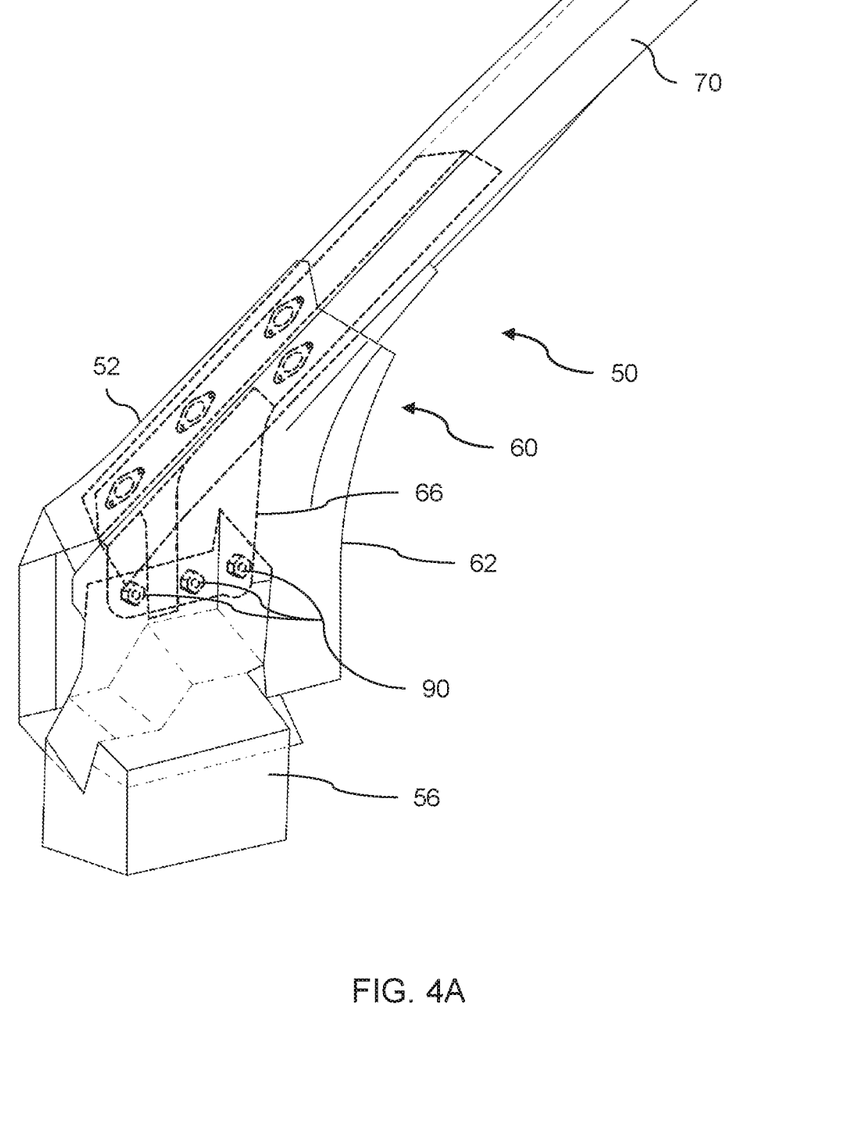
FIG. 4A is a perspective view of an exemplary joint structure in accordance with principles of the disclosed subject matter.
Figure 4B:
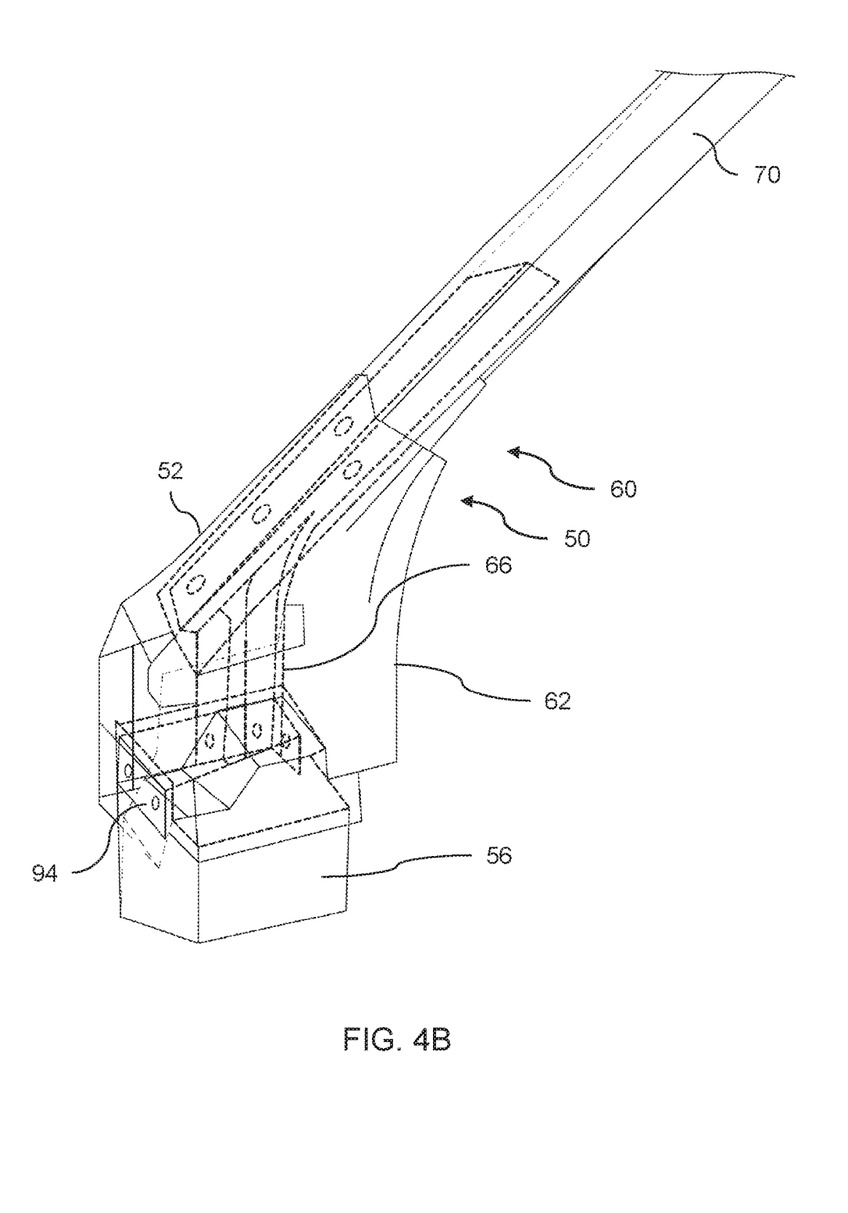
FIG. 4B is a perspective view of an alternate joint structure in accordance with principles of the disclosed subject matter.

FIGS. 4A and 4B display various embodiments of the joint structure 60 described above. These embodiments differ in the components used to cover the joint between the windshield lower beam 30 and the A-pillar 50, and corresponding bolt locations. The following embodiments allow decreased casting while providing enhanced or improved structural rigidity and reinforcement at the joint.

In FIG. 4A, a direct joint between the second joint member 66 and the lower pillar portion 56 of the A-pillar 50 is formed. A lower portion of the second joint member 66 extending within the first joint member 62 includes apertures and corresponding fasteners 90 aligned with and inserted through apertures in the upper end 58 of the lower pillar portion 56. The aligned apertures are disposed towards the interior of the vehicle and extend along multiple directions of the A-pillar 50.

In FIG. 4B, a direct joint between the second joint member 66, the lower pillar portion 56 of the A-pillar 50 and a portion of the damper mount 40 is formed. Specifically, the rear damper base 46 extends to the joint between the windshield lower beam 30 and the A-pillar 50, and include a damper flange 94 having apertures extending therethrough that align with apertures in the second joint member 66 and the upper end 58 of the lower pillar portion 56. Bolts or other fasteners may thereby be inserted through the overlapping apertures in the direct joint components to connect them. Adding the rear damper base 46 as a third component to the direct joint may serve to further enhance structural rigidity at the joint.

IV. Alternate Embodiments

While certain embodiments of the invention are described above, and FIGS. 1-4B disclose the best mode for practicing the various inventive aspects, it should be understood that the invention can be embodied and configured in many different ways without departing from the spirit and scope of the invention.

For example, embodiments are disclosed above in the context of the front frame assembly 20 of the front body portion 10 shown in FIGS. 1-4B. However, embodiments are intended to include or otherwise cover any type of frame assembly having structural members configured to deform and dissipate energy generated from a crash or impact event to enhance crash performance, as disclosed above.

Exemplary embodiments are intended to include front frame assemblies 20 having damper mounts 40 connecting suspension components to the vehicle body. This front frame assembly 20 is thereby configured to absorb and dissipate impact energy from a front crash involving suspension components of the vehicle. However, other portions of vehicle frame assemblies can incorporate relatively weakened and strengthened components to dissipate impact energy from other types of crashes, such as side or rear collisions, for example. Thus, in an alternate embodiment, a vehicle frame may similarly be configured to absorb and dissipate impact energy from a rear end collision such that the trunk or storage space of the vehicle deforms while protecting the adjacent passenger area.

All or some of the alternative structures disclosed above with regard to the front frame assembly 20 also apply to non-vehicular applications. The above alternative configurations of the damper mount 40, and specifically the weakened rear damper base 46, are merely provided for exemplary purposes, and as indicated above, embodiments are intended to cover any type of frame member having relatively weakened and strengthened portions that operate or otherwise perform as disclosed above. Embodiments are also intended to include or otherwise cover any alternative or additional frame members that are structured and disposed to perform as disclosed above with regard to the A-pillars 50 and corresponding joint structures 60.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the adjustable arm rest mechanism disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A frame assembly of a front body portion of a vehicle, the vehicle including a windshield connected to the front body portion, and at least one suspension component being connected to the front body, the frame assembly comprising:
    a windshield lower beam that extends along a lower edge of the windshield;
    a damper mount that is disposed on the front body portion at a location where the suspension component is connected to the front body portion, the damper mount being configured to deform when being subjected to an impact energy;
    an A-pillar including an upper pillar portion and a lower pillar portion, the upper pillar portion having a lower end disposed adjacent the windshield lower beam, the upper pillar portion extends away from the windshield lower beam and along a side edge of the windshield, and the lower pillar portion having an upper end disposed adjacent to the windshield lower beam; and
    a joint including a first joint member and a second joint member, the first joint member extends onto the upper pillar portion, the first joint member connecting the windshield lower beam to each of the lower pillar portion and the upper pillar portion, the first joint member connected to the damper mount, the second joint member connected to each of the windshield lower beam, upper pillar portion and lower pillar portion, the second joint member extends on the upper pillar portion, and the joint being configured to resist deformation due to the impact energy such that the damper mount deforms and dissipates the impact energy transmitted to the joint and the A-pillar.

2. The frame assembly according to claim 1, wherein the damper mount extends from the location where the suspension component is connected to the front body portion to a location adjacent a forward edge of the windshield lower beam, the damper mount being configured to deform and dissipate the impact energy without contacting the windshield lower beam.

3. The frame assembly according to claim 1, wherein the damper mount includes a front damper base connected to a rear damper base, the front damper base disposed where the suspension component is connected to the body and the rear damper base disposed adjacent a forward edge of the windshield lower beam.

4. The frame assembly according to claim 1, wherein the front damper base is formed of casting.

5. The frame assembly according to claim 4, wherein the rear damper base is formed as an aluminum sheet having relative structural weakness compared to the front damper base.

6. The frame assembly according to claim 5, wherein the front damper base is configured to resist deformation due to the impact energy and be displaced, thereby deforming the connected rear damper base to dissipate the impact energy.

7. The frame assembly according to claim 1, wherein at least one of the first joint member and the second joint member is formed of casting.

8. The frame assembly according to claim 7, wherein the first joint member covers the connection between the second joint member, the damper mount, and the A-pillar.

9. The frame assembly according to claim 1, wherein the second joint member, the damper mount, and the A-pillar are connected to each other.

10. The frame assembly according to claim 1, wherein the second joint member is approximately L-shaped in cross-section.

11. A vehicle having a front body portion including a windshield, the vehicle comprising:
    a suspension component; and
    a frame assembly configured to connect the suspension component to the front body portion of the vehicle, the frame assembly including:
    a windshield lower beam that extends along a lower edge of the windshield;
    a damper mount that is disposed on the front body portion at a location where the suspension component is connected to the front body portion, the damper mount being configured to deform when being subjected to an impact energy;
    an A-pillar including an upper pillar portion and a lower pillar portion, the upper pillar portion having a lower end disposed adjacent the windshield lower beam, the upper pillar portion extends away from the windshield lower beam and along a side edge of the windshield, and the lower pillar portion having an upper end disposed adjacent to the windshield lower beam; and
    a joint including a first joint member and a second joint member, the first joint member extends onto the upper pillar portion, the first joint member connecting the windshield lower beam to each of the lower pillar portion and the upper pillar portion, the first joint member connected to the damper mount, the second joint member connected to each of the windshield lower beam, upper pillar portion and lower pillar portion, the second joint member extends on the upper pillar portion, and the joint being configured to resist deformation due to the impact energy such that the damper mount deforms and dissipates the impact energy transmitted to the joint and the A-pillar.

12. The vehicle according to claim 11, wherein the damper mount extends from the location where the suspension component is connected to the front body portion to a location adjacent a forward edge of the windshield lower beam, the damper mount being configured to deform and dissipate the impact energy without contacting the windshield lower beam.

13. The vehicle according to claim 11, wherein the damper mount includes a front damper base connected to a rear damper base, the front damper base disposed where the suspension component is connected to the body and the rear damper base disposed adjacent a forward edge of the windshield lower beam.

14. The vehicle according to claim 11, wherein the front damper base is formed of casting.

15. The vehicle according to claim 14, wherein the rear damper base is formed as an aluminum sheet having relative structural weakness compared to the front damper base.

16. The vehicle according to claim 15, wherein the front damper base is configured to resist deformation due to the impact energy and be displaced, thereby deforming the connected rear damper base to dissipate the impact energy.

17. The vehicle according to claim 11, wherein at least one of the first joint member and the second joint member is formed of casting and is approximately L-shaped in cross-section.

18. The frame assembly according to claim 17, wherein the first joint member covers the connection between the second joint member, the damper mount, and the A-pillar.

19. The vehicle according to claim 11, wherein the second joint member, the damper mount, and the A-pillar are connected to each other.

20. A method of manufacturing a frame assembly of a front body portion of a vehicle, the vehicle including a windshield connected to the front body portion, and at least one suspension component connected to the front body, the method comprising:

forming a windshield lower beam that extends along a lower edge of the windshield;

disposing a damper mount on the front body portion at a location where the suspension component is connected to the front body portion, the damper mount being configured to deform when being subjected to an impact energy;

defining an A-pillar including an upper pillar portion and a lower pillar portion, the upper pillar portion having a lower end disposed adjacent the windshield lower beam, the upper pillar portion extends away from the windshield lower beam and along a side edge of the windshield, and the lower pillar portion having an upper end disposed adjacent to the windshield lower beam; and connecting a joint including a first joint member and a second joint member, the first joint member extending on the upper pillar portion, the first joint member connecting the windshield lower beam to each of the lower pillar portion and the upper pillar portion, the first joint member connected to the damper mount, the second joint member connected to each of the windshield lower beam, upper pillar portion and lower pillar portion, the second joint member extends on the upper pillar portion, and the joint being configured to resist deformation due to the impact energy such that the damper mount deforms and dissipates the impact energy transmitted to the joint and the A-pillar.

* * * * *